United States Patent [19]

Moore

[11] Patent Number: 4,965,960
[45] Date of Patent: Oct. 30, 1990

[54] METHODS AND DEVICES FOR USING POROUS MATERIALS IN THE CONTROLLED FEEDING, DISTRIBUTION, AND APPLICATION OF LIQUID AGRICULTURAL CHEMICALS

[76] Inventor: James E. Moore, 555 Riviera Dr., Naples, Fla. 33940

[21] Appl. No.: 186,246

[22] Filed: Apr. 26, 1988

[51] Int. Cl.$^5$ .............................................. A01M 21/00
[52] U.S. Cl. ........................................ 47/1.5; 401/199
[58] Field of Search ............... 401/199, 201, 261, 265; 47/1.5

[56] References Cited

U.S. PATENT DOCUMENTS

| | | | |
|---|---|---|---|
| 2,659,918 | 11/1953 | Stoner | 15/131 |
| 2,988,849 | 6/1961 | Laughlin | 47/1.5 |
| 3,002,319 | 10/1961 | Laughlin | 47/57.5 |
| 3,009,290 | 11/1961 | Bratton | 47/1.5 |
| 3,086,241 | 4/1963 | Bohn | 401/201 X |
| 3,114,928 | 12/1963 | Spiteri | 401/201 |
| 3,184,888 | 5/1965 | Fruth et al. | 47/1.5 |
| 3,368,233 | 2/1968 | Lemberger | 401/201 X |
| 4,126,962 | 11/1978 | Polcaro | 47/1.5 |
| 4,187,638 | 2/1980 | Hardy et al. | 47/1.5 |
| 4,291,491 | 9/1981 | Maddock | 47/1.5 |
| 4,305,224 | 12/1981 | Maddock | 47/1.5 |
| 4,403,881 | 9/1983 | Keeton | 401/202 |
| 4,597,219 | 7/1986 | Kropf | 47/1.5 |
| 4,716,677 | 1/1988 | Moore | 47/1.5 |

FOREIGN PATENT DOCUMENTS

| | | | |
|---|---|---|---|
| 1146944 | 5/1957 | France . | |
| 428721 | 10/1974 | U.S.S.R. . | |
| 979735 | 1/1965 | United Kingdom | 401/201 |
| 2120915 | 5/1982 | United Kingdom . | |

OTHER PUBLICATIONS

"Weed Sweep" Herbicide Applicators, Weed Control Systems, P.O. Box 7795, Naples, Fla., 33941, Oct. 1986 (5 pages).
Batten, "Those Irrepresible, Incredible, Impossible Grassy Weeds!" Green Section Record, Sep./Oct. 1984, pp. 1–4.
"The New Century Super-7 Wick Bar Applicator," Century Engineering Div., ExCell-O Corp., Cedar Rapids, Iowa., Jun. 1981 (2 pages).

*Primary Examiner*—David A. Scherbel
*Assistant Examiner*—Jerrold D. Johnson
*Attorney, Agent, or Firm*—Arnold, White and Durkee

[57] ABSTRACT

Dimensionally-stable porous materials such as porous plastic are used in a variety of ways to provide uniform distribution and application of liquids to vegetation. Porous plastic can be readily cut, sawed and drilled to provide liquid distribution channels and various applicator shapes. Porous plastic is easily glued or welded for joining to other materials. Rods, tubes and handles are easily inserted into the porous plastic, and selected areas of the porous surfaces are readily sealed with glue or by melting to confine liquid application to selected areas. The pore size, preferably in the range of 5 to 200 microns, can be selected in accordance with the viscosity of the liquid and the desired rate of flow and pressure. Porous plastic can be highly abrasion resistant, which is especially useful for constructing applicators which rest upon the ground or pavement. Where abrasion is not a problem, the porous plastic may serve to distribute liquid to a soft absorbent applicator such as a sponge. Unitary applicators are readily fashioned from a block of porous plastic by forming a connection to a sprayer nozzle or squeeze bottle, drilling a hole to provide an internal distribution channel, and sealing surfaces that are not intended to deliver liquid.

30 Claims, 4 Drawing Sheets

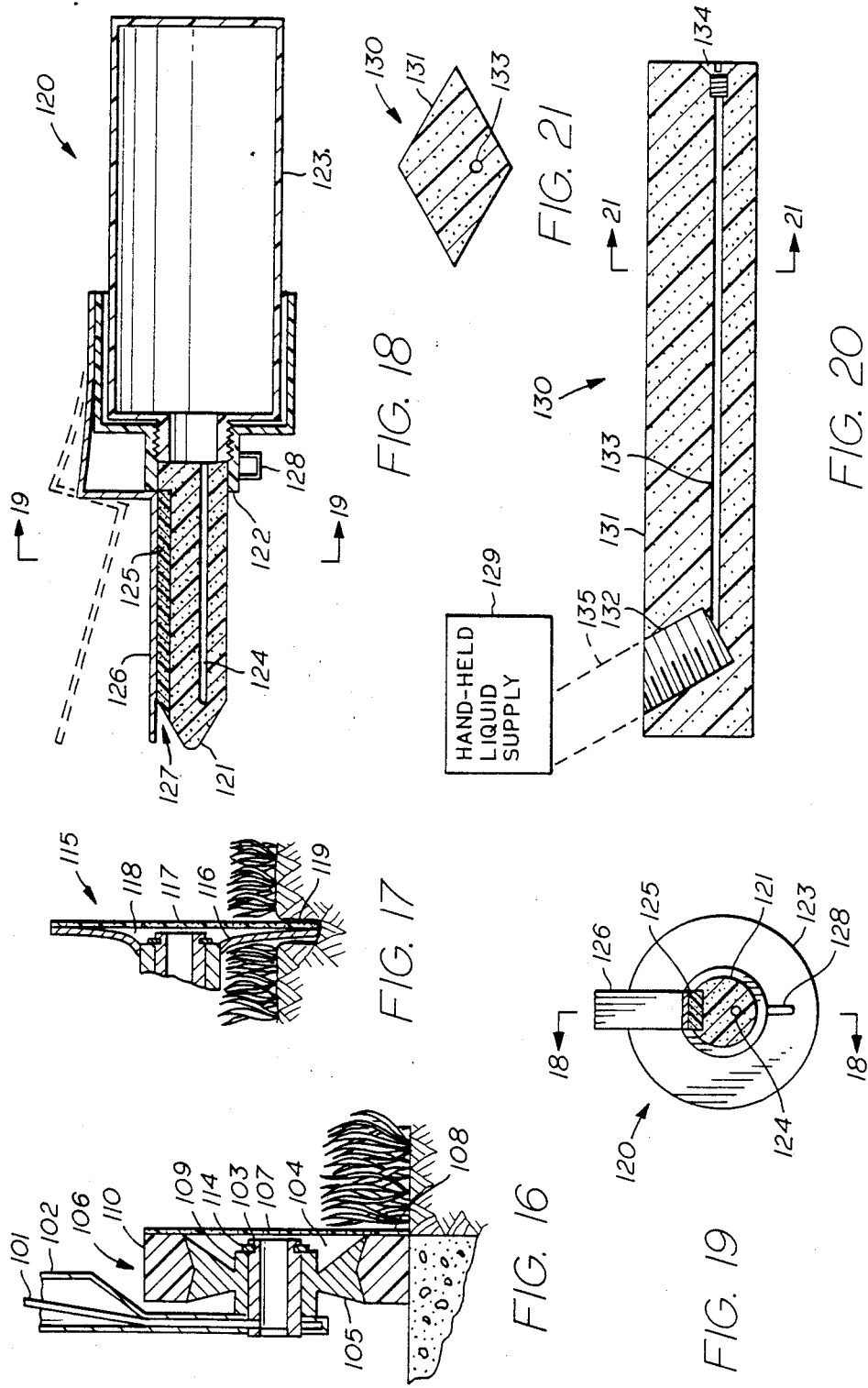

METHODS AND DEVICES FOR USING POROUS MATERIALS IN THE CONTROLLED FEEDING, DISTRIBUTION, AND APPLICATION OF LIQUID AGRICULTURAL CHEMICALS

BACKGROUND OF THE INVENTION

1. Field of the Invention

This invention relates generally to the selective application of chemicals to plants. The invention relates specifically to the use of porous materials for controlling the feeding, distribution and application of liquid agricultural chemicals.

2. Description of Related Art

Conventional methods of applying chemical substances to vegetation include spraying, sprinkling or sowing solutions or mixtures of chemicals over the whole planted area. When such "broadcast" methods are used to kill targeted plants that are near desirable vegetation, unnecessary dilution is required, uneven distribution frequently occurs, chemicals are wasted, the cost of chemicals is increased, adjacent vegetation is subjected to harmful amounts of undesired chemicals, and vegetation far removed from the treatment area is subjected to the chemicals due to "drift", "vaporization", "translocation", or "leaching". Even when selective or beneficial chemicals are distributed by such methods, many of these disadvantages are experienced.

To avoid difficulties associated with the broadcast methods, the individual application of chemicals has been made by hand to selected plants. Selective application has permitted the use of highly potent but relatively safe non-selective herbicides for the control of weeds and other undesirable vegetation. A preferred kind of nonselective herbicide is a 41% solution of isopropylamine salt of N-(phosphonomethyl) aglicine, as further described in U.S. Pat. Nos. 3,799,758 and 4,405,531, and sold under the trademark "ROUNDUP" by the Monsanto Company, Agricultural Products Div., St. Louis, Missouri, 63167.

As disclosed in Laughlin U.S. Pat. No. 2,988,841, mechanical devices have been proposed for the direct application of chemical substances to selected plants. An applicator such as a brush or pad is traversed across the area of vegetation at a pre-selected height, speed and angle, so as to produce a treatment zone without affecting underlying vegetation. Such a mechanical device includes height controlling wheels and a push handle or tractive support, or applicator brushes or pads are adjustably mounted on a rake-like structure.

Mechanical devices for the direct application of chemical substances to plants have been manufactured and sold as attachments to tractors. Hardy et al. U.S. Pat. No. 4,187,638 discloses a rope wick applicator in the form of an elongated pipe having a number of exposed portions of wick protruding from the pipe at spaced locations. Similarly an applicator has been manufactured and sold by Ex-Cell-0 Corporation, Century Engineering Division, Cedar Rapids, Iowa 52401, in the form of an elongated pipe having its lower outer surface covered with a carpet fed with chemical solution.

Weed control at golf courses has been an especially difficult task. As described by Steve M. Batten in his article "Those Irrespressible, Incredible, Impossible Grassy Weeds" in USGA Green Section Record, September/October 1984 pp. 1–4, millions of dollars are spent annually and thousands of hours are devoted to golf course weed control. Weed control methods include scalping, deep-set vertical mowing, turning off irrigation, hand removal, excavation, and starvation by eliminating normal fertilization. Spot application of non-selective herbicide is typically made with hand-held sprayers, plastic squeeze bottles, hypodermic syringes, and paint brushes. Spot application requires the judgment of a person to determine what is a weed or where to place the herbicide. For this reason, this type of weed control has been difficult to automate or conduct with large tractors or maintenance vehicles. However, there are methods to selectively place herbicides such as "ROUNDUP" with large implements. Rope wick applicators can paint the top half of tall fescue or smutgrass above the grown height of desired turfgrasses. Weed kill results by translocation of the "ROUNDUP".

Rope wick or pad applicators have not been sufficiently accurate to selectively kill undesirable vegetation that extends only slightly above the desired vegetation, without causing some damage to the desired vegetation. This basic problem has been found to be related to a number of subsidiary problems including unstable operation of the applicator, undue complexity, inability to cover large areas in a reasonable time period, and the influence of uneven ground, clumps of weeds and foreign objects. In order avoid these difficulties, several improved devices and methods have been invented and set forth in Moore co-pending patent application Ser. No. 820,987, on "Devices and Methods For Selective Application Of Herbicides," filed Jan. 21, 1986.

With regard to the spot application of herbicides to specific plants, another known method is to use a rubber glove having an outer absorbent mitten or sponge which is dipped in a container of herbicide solution and then wiped against undesired vegetation.

Still another method of manually applying herbicide to selected plants is to use an applicator of the kind having a handle carrying a sponge at the lower end of the handle. In one such applicator, advertised under the trademark "Walk A Wick", an applicator bottle containing a supply of herbicide solution is mounted on the upper end of the handle and is provided with a calibration valve for metering a regulated flow of herbicide from the applicator bottle to the sponge. A particular version designated as "Model 200 Pro Applicator" has a cylindrical sponge which may be provided with an optional shield.

While these methods and devices are suitable for applying herbicide to a rather large area of plants by sweeping the applicator or sponge across the undesired vegetation, or to isolated plants by blotting them with a tip of the applicator or sponge, considerable care must be taken to avoid contact with desirable grasses, plants or shrubs as injury may occur. Therefore, these devices are not especially suited for applying herbicide to weeds that are surrounded by and in close proximity to desired plants. Also, the exposed foliage of many kinds of plants is not sufficiently stiff to receive a desired amount of herbicide merely by contact or wiping against an applicator or sponge. In order to avoid these difficulties, several improved manual devices and methods for selective application of chemical substances to plants have been invented and are described in Moore, U.S. Pat. No. 4,716,677, issued Jan. 5, 1988.

Many of the applicators and methods previously available for applying chemicals to plants suffer from one or more of the following deficiencies: inaccurate control of the flow of chemical to the applicator; uneven distribution of the chemical to the applicator surfaces, resulting in a tendency to drip or to have an inadequate supply of chemical available; inaccurate control of flow to various portions of the applicator, particularly when operating on sloping terrain; or poor abrasion resistance of the applicator surface. Other disadvantages include complexity, difficulty of manufacture, poor quality control and high cost.

In an attempt to solve some of these problems, one pad applicator uses an especially configured synthetic sponge which is formed with a relatively dense peripheral skin so that the liquid herbicide received will evenly saturate the entire sponge to prevent uncontrollable liquid flow in localized parts of the sponge. Such a device has several possible disadvantages, including high cost, difficulty of manufacture, lack of abrasion resistance, vulnerability to damage, and being subject to excessive discharge of liquid when pressed or rapidly moved. Since a relatively large supply of liquid at its highest pressure is present within the applicator sponge near its skin, even a small puncture or tear of the skin could cause an undesirable release of this liquid.

There is still a widespread problem of encroachment of turf grasses and weeds into and onto areas that should be kept free of such growth such as flower beds and other plantings, golf course sand traps, paved surfaces, and unpaved barren areas. Costly, time-consuming or damaging methods of controlling such encroachment include spraying of herbicides, mechanical edging, and removal by hand.

Rigid or semi-rigid porous metals, ceramics and plastics have been produced for many years. Porous plastics are manufactured and marketed by Porex Technologies Corp., 500 Bohannon Road, Fairburn, Georgia 30213. Standard Porex products are available in a variety of shapes and sizes, materials of construction, porosities, densities, and resistances to abrasion. Porex publications list "Applicators", "Controlled metering Devices", and "Wicking" devices as products using its porous plastic components. Such products include pens and other inking devices, filters, air diffuser plates, etc. In contrast to sponges and open-cell plastic foam, porous plastic is dimensionally-stable and can be cut, sawed, drilled, tapped and threaded using ordinary wood or metal working tools.

SUMMARY OF THE INVENTION

Accordingly, the primary object of this invention is to provide chemical applicators in which the applicator surfaces are accurately and uniformly fed an adequate supply of liquid under a wide variety of conditions and needs, without being over-fed at any location.

A specific object is to maintain a surplus of chemical at the applicator surfaces for immediate removal by all vegetation contacted. A related object is to minimize the hydrostatic pressure impressed upon surplus liquid retained immediately above the applicator surface.

Another specific object is to provide applicator systems and configurations that permit continuous operation above the cut height of turf without liquid dripping onto the turf. A related object is to provide such a system that permits the applicator to be operated continuously on a sloping surface without an objectionable amount of migration and dripping occurring. An alternative object is to provide applicator systems and configurations that permit the discharge and application of a liquid in a continuous, uniform swath, directly onto all vegetation or other surfaces traversed.

Still another object is to provide complete liquid feeding systems, from the feed source to the applicator surface, that are capable of being shut-off instantly and without further discharge, and then re-started instantly.

A related object is to provide applicator systems that are sealed so as to avoid the danger of accidental spillage, leakage, or unnecessary contamination of the equipment, the operator and the surroundings.

Yet another object is to provide applicator surfaces that are highly resistant to abrasion and other damage.

And still another object is to provide applicator surfaces that are resistant to contamination by foreign matter and are easily cleaned.

Moreover, these applicators and systems should be capable of distributing and applying a wide variety of liquid chemicals, including herbicides, insecticides, fungicides, and fertilizers.

BRIEF DESCRIPTION OF THE DRAWINGS

Other objects and advantages of the invention will become apparent upon reading the following detailed description and upon reference to the drawings in which:

FIG. 16 is a cross-section view along line 16—16 in FIG. 15;

FIG. 17 shows a modification of the applicator of FIG. 16;

FIG. 18 is a cross-section view along line 18—18 of FIG. 19 of a tonq-type applicator having a self-contained supply of liquid;

FIG. 19 shows a cross-section view along line 19—19 of FIG. 18;

FIG. 20 shows an applicator for attachment to a conventional source of liquid, such as a sprayer; and FIG. 21 shows a cross-section view along line 21—21 of FIG. 20.

Figure 1:
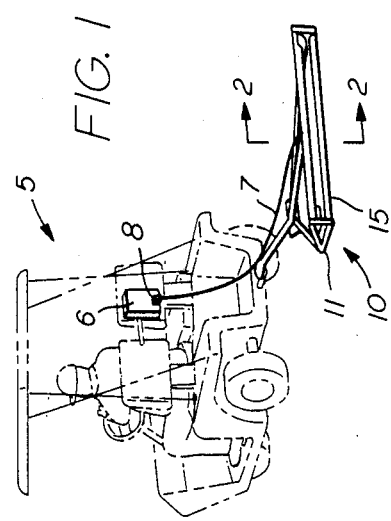
FIG. 1 is a perspective view showing a preferred embodiment of an herbicide applicator assembly being drawn by a golf cart on which is mounted a liquid feed system that is connected to an applicator bar by a feed tube.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined in the appended claims.

DETAILED DESCRIPTION OF THE PREFERRED EMBODIMENT

Turning now to the drawings, there is shown in FIG. 1 an herbicide applicator assembly generally designated 10 that is pulled like a sled by a golf cart 5. The applicator assembly has a supporting frame 11 that rests on the turf and supports an applicator bar 15 at a preselected height. A collapsible container 6 containing a supply of herbicide feeds the applicator bar 15 by a flexible tube 7. The outlet of the container 6 is equipped with a flow regulating valve 8. Further details of the applicator assembly and its method of operation are disclosed in Moore co-pending U.S. patent application Ser. No. 820,987, filed Jan. 21, 1986, herein incorporated by reference.

Figure 3:
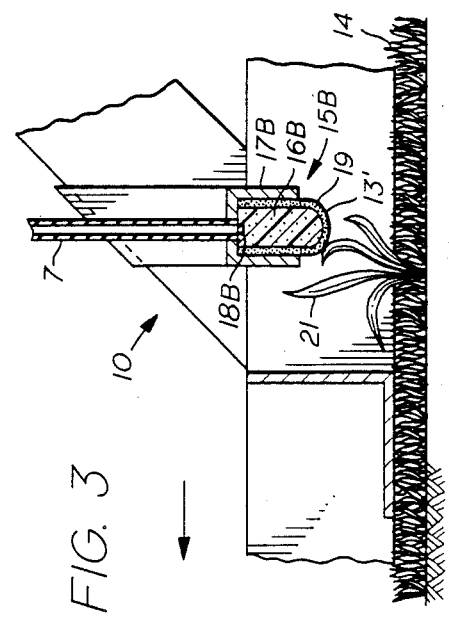
FIG. 3 is a modification of FIG. 2 showing an alternative design for the applicator bar.
Figure 4:
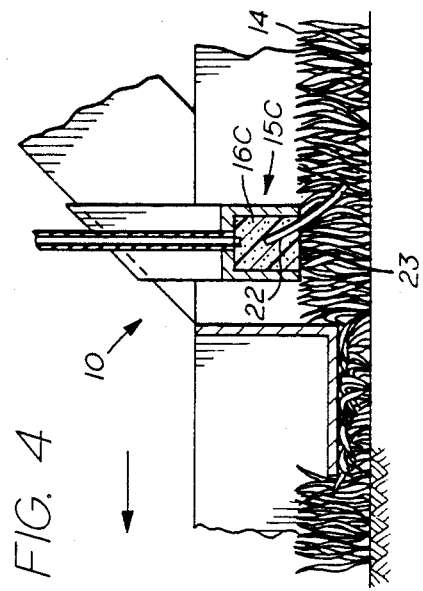
FIG. 4 shows another alternative design for the applicator bar shown in FIG. 2.

The present invention more particularly concerns the use of a dimensionally-stable or substantially rigid porous material for applying liquids to vegetation. The applicator assembly 10 may incorporate the present invention in a number of ways, as illustrated by three alternative designs 15A, 15B and 15C for the applicator bar 15, which are shown in FIG. 2, FIG. 3 and FIG. 4, respectively.

Figure 2:
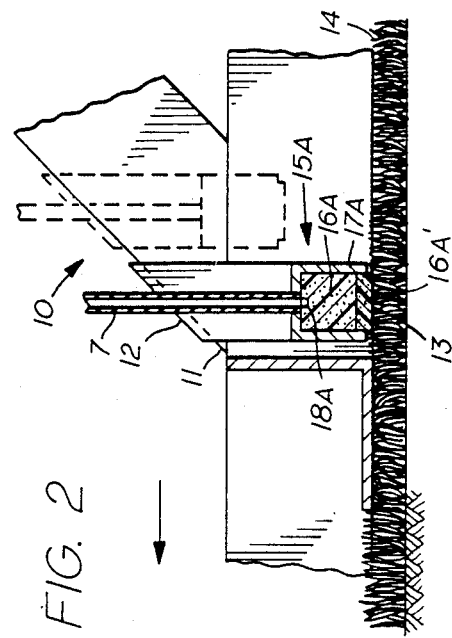
FIG. 2 is a cross-sectional view along line 2—2 in FIG. 1.

FIG. 2 is a cross-section view along line 2—2 of FIG. 1, showing a first alternative design 15A of the applicator bar. Each end of the bar 15A is supported from the frame 11 at a selected height by a respective bracket 12, so that the applicator surface 13 is in contact with the turf 14.

Applicator bar 15A has an elongated porous plastic distribution block 16A, which is sealed within an inverted U-shaped aluminum rail 17A. A liquid distribution channel 18A is cut in the top surface of the block. In operation, the liquid feed flows by gravity from tube 7 to fill the channel 18A, which supplies feed to the distributor block 16A along its entire length. The liquid passes uniformly through the pores of the plastic block and collects on a lower surface 13, where it is available to be wiped onto the surface of the turf 14, as the assembly 10 is pulled over the turf. Since the plastic block 16A is tough, abrasion resistant and resilient, it is very resistant to wear and damage. The abrasion resistance can be increased by facing the block 16A with a sheet 16A' of especially tough porous plastic.

A good liquid flow connection can be made between the sheet 16A' and the block 16A by forming the block 16A with a slightly convex surface, applying adhesive such as epoxy in narrow strips at the outer longitudinal edge portions of the sheet 16A; and clamping the sheet 16A' onto the block 16A while the adhesive hardens. Therefore contact between the internal unsealed surfaces of the block 16A and the sheet 16A is assured due to the resiliency of the sheet 16A'. Alternatively, a thin sheet of highly absorbent fibrous material or cloth could be interposed between the block 16A and the sheet 16A' for conducting liquid across any gap.

Selective herbicides and beneficial or harmless liquids, such as fertilizers, insecticides or fungicides are applied with the applicator bar 15A' in a lower position as shown in solid lines in FIG. 2. For example, it has been discovered that unusually concentrated solutions of certain selective herbicides can be safely and effectively applied in this manner to eliminate patches of undesired weeds. For instance, the chemical "Basagran" is typically used to remove patches of water sedge from Bermudagrass turf on all areas of golf courses. A one percent solution of Basagran, sprayed in a conventional manner on golf course greens that were under heat stress, caused excessive damage to the greens. In contrast, a twenty percent solution of Basagran regularly applied under similar conditions, but in accordance with this invention so that the chemical was applied only to the surface of the turf, removed the sedge without damaging the turf.

In an alternative method of operation, the applicator bar 15A is raised above the cut height of the turf (to the position shown in phantom lines in FIG. 2), and nonselective as well as selective herbicides are applied continuously to vegetation that is above the cut height of the turf. In this case, the turf is not contacted by the applicator bar and therefore, the turf is undamaged except by an occasional drop of any excess liquid fed. This arrangement is used in cases where some damage to the underlying turf can be tolerated, such as when treating heavy infestations of large undesirable plants, particularly those in newly planted turf.

FIG. 3 shows a second alternative design 15B of the applicator bar. A soft, flocked sponge 19 is provided to make available an excess of liquid at the applicator surface 13'. The sponge 19 encloses the applicator block 16B on three sides as shown, and is wedged on two sides between the block and the aluminum frame 17B. Glue is applied to the top, end and side faces of the block 16B to hold the block and sponge in place and to seal the ends of the applicator bar 15B. The glue also prevents liquid from bypassing the applicator block 16B by filling in any gap between the applicator block and the top inner surface of the aluminum rail 17B.

Since the soft sponge 19 usually holds an excess supply of liquid and is not as resistant to damage as the plastic block, the bar 15B is usually positioned above the cut height of the turf. The bar 15B is fed with liquid by the system shown in FIG. 1. The liquid flowing via the feed tube 7 fills the channel 18B, supplying liquid above the full length of the distribution 16B. The liquid passes through the pores of the block to the lower face of the block and into the sponge 19, where it is stored until pulled from the applicator surface 13' by weeds 21, as the assembly 10 is pulled oVer the supporting turf 14.

Under normal operating conditions, the sponge 19 is first loaded with herbicide (by opening the valve 8 in FIG. 1) and then the feed is shut off (by closing the valve 8) before operation is started. When the amount of liquid in the sponge reaches a low point, usually after an hour or more of operation, it is recharged (by opening and then closing the valve 8). When herbicide usuage is abnormally high and when occasional dripping is not objectionable, the feeding may be continuous. However, since the system has a high holding capacity (when the valve 8 is closed), intermittent operation is preferred. An important aspect of this invention is that the sponge 19 can be kept in a "supersaturated" condition as long as the feed system is kept sealed (when the valve 8 is closed), as indicated by the fact that a sudden discharge of an appreciable amount of liquid can occur when air is admitted into the feed system at any point above the sponge.

FIG. 4 shows a third alternative design 15C of the applicator bar. Stiff, but somewhat flexible plastic tubes 22 are inserted into equally-spaced holes of uniform depth drilled into the porous plastic block 16C. The tubes 22 are secured in place by a layer of glue that covers the bottom 23 of the block and seals it from leakage. In operation, the liquid passes through the pores of the block 16C, then through the tubes 22 and into the turf 14. Since the tubes are stiff, as Well as somewhat flexible and rearward sloping, they penetrate the surface of the turf. Since the liquid is discharged primarily below the surface of the turf, this design is advantageous when using strong chemicals that would damage the turf if the liquid were applied to the surface.

In a simple modification of the design of FIG. 4, the drilling of holes is omitted, the tubes 22 are inserted into the plastic block by force, and the glue is omitted. In this design, small diameter rods can be used instead of tubes. The purpose of this arrangement is to permit the application of chemicals, such as selective herbicides, directly onto weeds growing above and below the cut surface of the turf, since a portion of the liquid flows downward on the surfaces of the tubes or rods.

Figure 5:
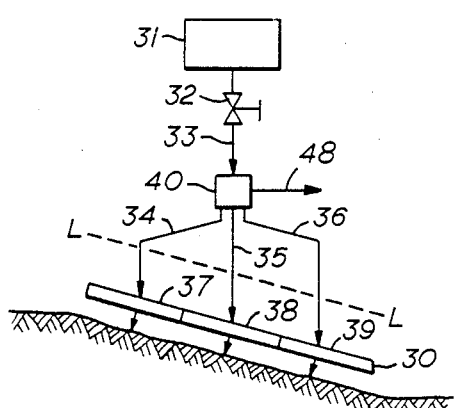
FIG. 5 is a flow diagram of a system for feeding multiple sections of an applicator bar, using a flow splitter.
Figure 6:
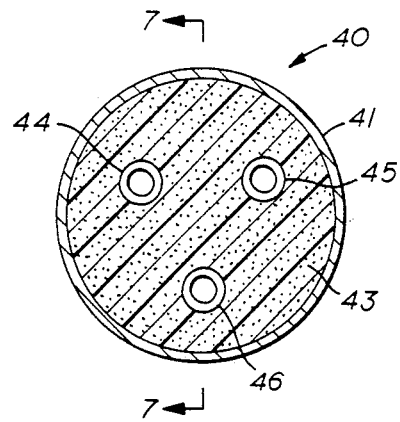
FIG. 6 is a cross-section view of the flow splitter shown in FIG. 5, along line 6—6 of FIG. 7.
Figure 7:
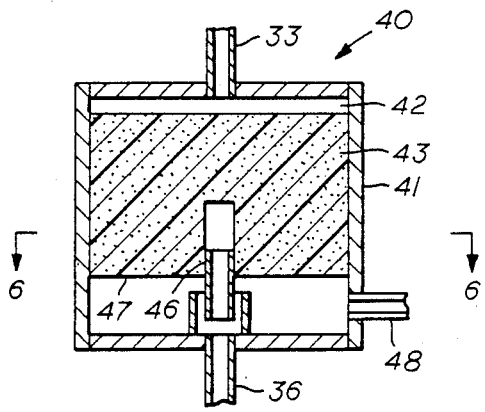
FIG. 7 is a cross-section view along line 7—7 of FIG. 6.

Turning now to FIGS. 5-7, there is shown a system for splitting the flow of liquid into several streams, so as to feed approximately equal amounts to a multiplicity of sections of an applicator bar 30, such as one of those described above. This system is intended to permit the bar to discharge the liquid uniformly along it full length, even when continuously traversing a sloping surface, such as those occurring alongside highways. In this arrangement, the liquid from a feed container 31, controlled by a regulator valve 32, flows through a tube 33 into a flow splitter 40 which divides the flow into the number of streams desired. For simplicity only three streams are shown. These streams are fed via distribution tubes 34-36 to three sections 37-39 of the applicator bar 30. The neighboring sections are isolated from one another by partitions.

FIGS. 6 and 7 show the internal arrangement of the flow splitter 40. The casing 41 is a cylinder that is sealed at each end. Liquid from the tube 33 fills a chamber 42 and flows through the pores of a porous plastic block 43 that is glued in place as shown. Three equally-spaced tubes 44-46 of equal length are installed in holes of equal depth in the lower section of the block 43. The lower face of the block is sealed with glue 47, which holds the tubes in place. Each tube discharges into an enlarged section of one of the distribution tubes 34-36, through which the streams of liquid flow by gravity to their respective sections 37-39 of the applicator 30. The enlarged sections of the distribution tubes 34-36 are provided in order to vent the tubes to the atmosphere via tube 48. As shown in FIG. 5, the flow splitter 40 is located at an elevation high enough above the highest operating point on the applicator bar 30 so that none of the tubes will overflow. In addition the flow splitter is so small that normal changes in its slope will have negligible influence on the distribution of liquid among the discharge tues. With this arrangement, the liquid level L-L in each tube 34-36 is determined by the resistance to flow through the distribution block in its respective section 37-39. Assuming that all of these resistances are equal, the head of liquid above the midpoint of each section will be the same, regardless of the slope of the applicator bar 30.

Although the features described in FIGS. 1-7 are shown in connection with large, vehicle-drawn applicators, the principles involved are equally applicable to other units, having a wide range of shapes and sizes, including many manually operated devices. For example, lightweight forms of the applicator bars shown in these figures can have suitably braced handles attached at their mid-points and can be pulled by hand. In this case, the feed container can be small and carried by the operator or large and mounted on a vehicle. If necessary, the feed container can be pressurized. Systems normally used to supply liquid under pressure to spray-type applicators can also be used to feed applicator bars in accordance with the present invention.

The applicator systems and methods of the present invention are also useful in connection with other applicators, such as are described in the above-mentioned Moore U.S. patent application Ser. No. 820,987 and U.S. Pat. No. 4,716,677. Other applicator designs have shapes resembling "hockey sticks", "hockey pucks" and "pokers". Hockey-stick-shaped applicators are made from combinations of a bar, similar to one of those shown in FIGS. 2-4, a handle and a liquid feed system. Puck-shaped applicators include similar arrangements, in which the applicator is round, rather than rectangular. Poker-shaped applicators are similar, except that the applicator is mostly enclosed within the tip of the handle.

Figure 8:
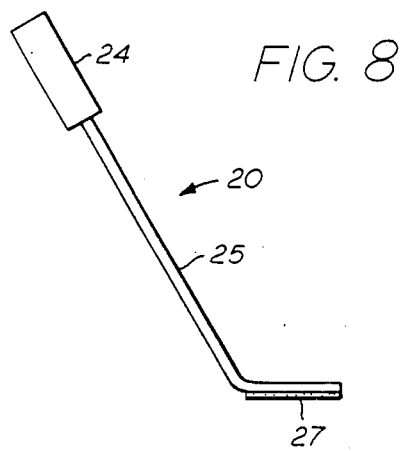
FIGS. 8 and 9 show an applicator bar for manual operation.
Figure 9:
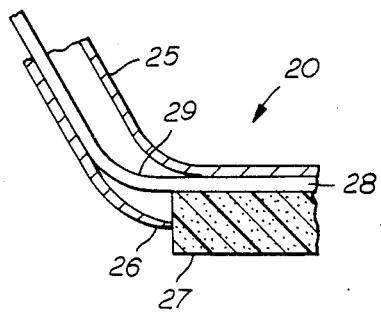

Turning now to FIGS. 8 and 9, there is shown a lightweight hockey-stick applicator generally designated 20, in which the applicator section may be similar to any one of those shown in FIGS. 2-4. The feed supply is contained in a squeeze bottle 24, which serves as the hand grip for a hollow square handle 25, which is bent at its lower end, as shown. The lower flange of the lower section 26 is cut away to accommodate a porous plastic applicator bar 27, which is glued in place. A channel 28 cut in the applicator bar provides liquid to the full length of the bar. A small-diameter tube 29 inside of the handle feeds liquid from the bottle 24 to the channel 28. The bottle is squeezed to feed the applicator bar, and the pressure is released to stop the flow. It is desirable that the assembly be turned upside down when not in use, to prevent undesired leakage.

Figure 10:
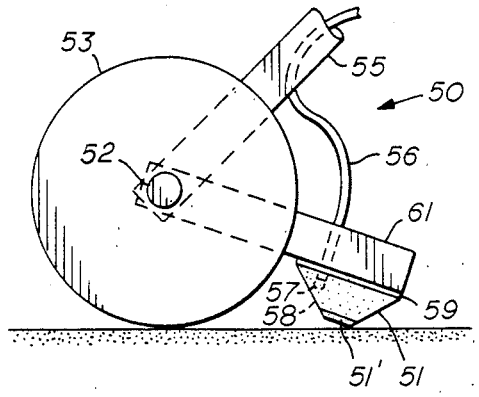
FIG. 10 is a side view of an applicator bar cantilevered from the shaft connecting two wheels and a handle.
Figure 11:
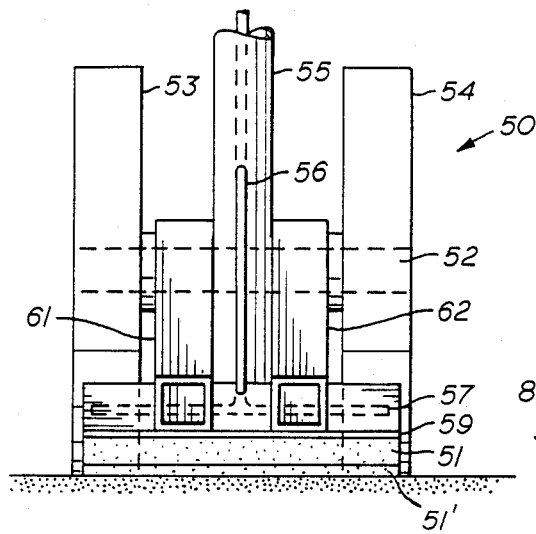
FIG. 11 is an end view of the applicator shown in FIG. 10.

Turning now to FIGS. 10 and 11, there is shown an applicator assembly generally designated 50, which is especially suited for applying a liquid in a continuous swath. This unit is especially useful in applying an herbicide to vegetation encroaching onto pathways, cart paths, roadways, sidewalks, etc. The porous plastic applicator block 51 is cantilevered from a shaft 52 that connects the two supporting wheels 53 and 54 with the operating handle 55. The liquid enters the assembly from its source (usually a collapsible container carried by the operator), via tube 56 that discharges the liquid into the tubular channel 57, then through pores in the plastic to the nearest face 58 of the block 51. A reinforcing cover 59, glued to the upper surface of the block, is fastened to the two support arms 61 and 62, which are cantilevered from the shaft 52. The cover 59 is made of heavy metal when added weight is needed to keep the block 51 in contact with the surface being treated. The abrasion resistance of the lower surface of the block 51 could be enhanced by lamination of a sheet of highly abrasion resistant porous plastic 51', In operation, the assembly is pushed by the handle over the surface to be treated, and a uniform swath of liquid, seeping from the leading surface 58 of the applicator block, flows down the face and onto the surface traversed. Enroute, the liquid is preferentially applied to any vegetation extending above this surface, before it reaches the surface. To stop the flow of liquid, the applicator is lifted above the source, or a valve at the source is closed. Preferably, the tube 56 is sized to obtain the desired flow rate.

Figure 12:
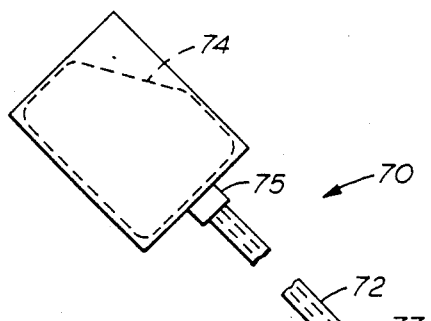
FIG. 12 is a side view of a paddle-type applicator shown in a vertical mode of operation.
Figure 13:
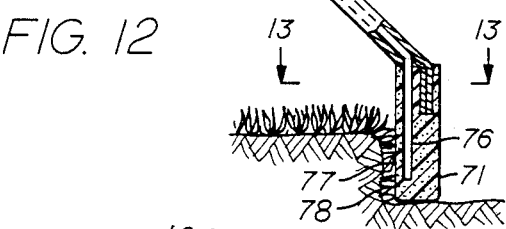
FIG. 13 is a cross-section view along line 13—13 in FIG. 12, but with the paddle positioned to be operated in a horizontal mode.
Figure 13:
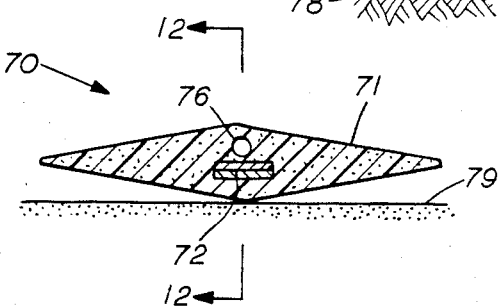

Turning now to FIGS. 12 and 13 there is shown a paddle-type applicator assembly generally designated 70, which is useful in applying growth regulators to vertical as well as horizontal surfaces of vegetation. The porous plastic applicator block 71 is mounted to a handle 72 extending at a 45 degree angle, as shown, and is supplied by a feed tube 73 that passes through the handle from a collapsible feed storage container 74. The size of the feed tube is selected to supply liquid at the approximate rate desired, so that the feed can be started, stopped and regulated by changing the relative elevations of the container 74 and paddle 71. The feed container 74 is disconnected at a coupler 75 for refilling. FIG. 12 shows the applicator assembly 70 being used to wipe the vertical face of turf 78 adjacent to a golf course sand trap. When the paddle is in this position, the liquid flows down the tube 73, into the tubular channel 76, and then through the porous block 71 to its nearest face 77, adjacent to the vertical face of the turf 78. When the paddle is horizontal, as shown in FIG. 13, the liquid flows from channel 76 through the pores, including those surrounding the embedded portion of the handle 72, to the lower face and onto the vegetation 79.

Figure 14:
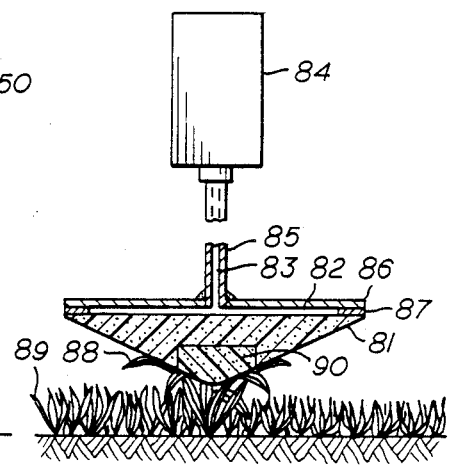
FIG. 14 is an elevation view of a poker-type conical applicator.

Turning now to FIG. 14, there is shown a "poker-type" assembly generally designated 80 that is especially suited for applying herbicide selectively to individual, large weeds having multiple sets of leaf, stem and root components connected together, such as annual rye grass clumps, which are difficult to kill. The round applicator block 81, consisting of porous plastic, is uniformly supplied with herbicide by means of a channel 82, which is connected to a squeeze bottle 84, by a small-diameter tube 83 that passes through the handle 85. The round cover 86, gasket 87, and block 81 are glued together to form the round channel, as shown in the cutaway section. The applicator block 81 is shaped in the form of an inverted flat cone so as to enable it to apply herbicide to a large portion of plants 88 of various sizes, without contacting surrounding turf 89. In operation, herbicide is applied by pushing the tip of the block 81 into the center of the weed clump 88 and squeezing the bottle 84. The flow is stopped by releasing the pressure on the bottle.

A portion or all of the applicator surface of the block 81 can be covered with an absorbent material, similar to the arrangement illustrated in FIG. 3, so as to store a supply of liquid at the point of use and speed up the operation. As shown in FIG. 14, for example, soft absorbent material such as a sponge 90 is inserted into a recess in the tip of the applicator block 81. In an alternative design, the block is made with a flat bottom (puck shaped), so as to treat the entire surface beneath the applicator. With a sloping handle installed, this type of applicator is useful in killing vegetation surrounding trees, shrubs, etc.

Figure 15:
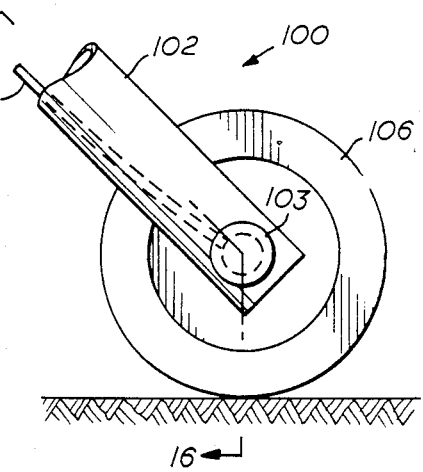
FIG. 15 is a side view of a single-wheel applicator having a porous sidewall applicator surface.

Turning to FIGS. 15 and 16, there is shown an applicator assembly generally designated 100 that is especially useful in applying a growth regulating liquid to the face of high turf bordering driveways, flower beds, etc. In this assembly, the liquid enters through a feed tube 101, passes through a hollow handle 102 and a hollow shaft 103, and discharges into a chamber 104 that is provided between a solid web 105 of a wheel 106 and a porous plastic sidewall 107. The sidewall 107 (preferably Porex 35 micron HDPE sheet) is in the form of a disk-shaped plate which is glued to the sidewall of a tire 110 mounted on the solid web 105. The liquid seeps through the pores in the sidewall 107 and covers its entire surface, as the wheel is pushed alongside the turf edge 108, and the liquid is wiped onto any vegetation contacted. Excess liquid is deposited in a thin line on the underlying surface traversed, including any underlying vegetation. In order to minimize leakage, a close fit is provided between a clamp ring 114, the shaft 103 and the hub 109, and the outer end 111 of the shaft is sealed. When it is desired to discontinue operation temporarily, the wheel 106 is raised above the liquid source and rotated 90° about the axis of the handle 102 so as to retain unused liquid in the chamber 104.

FIG. 17 shows a modification 115 of the applicator illustrated in FIGS. 15 and 16 in which the tire of the wheel is omitted, and a flared rim 116 is used to join a porous plastic sidewall 117 at the perimeter of the wheel, while forming an enclosed chamber 118. With this arrangement, the wheel is very thin at it perimeter and can be operated within a groove 119 cut in the sod. This device is used to apply herbicide within grooves surrounding the golf course greens, in order to prevent unwanted grasses growing around the greens from encroaching into special grasses growing on the greens.

Turning now to FIGS. 18 and 19, there is shown an applicator 120 similar to the applicator illustrated in FIGS. 17–19 of the aforementioned Moore U.S. Pat. No. 4,716,677. The applicator 120 is a hand operated device for applying herbicides and other liquids to individual leaves of plants while avoiding contamination of adjacent foliage. A cylindrical porous plastic applicator block 121 has a threaded connector 122 for attachment to a squeeze bottle 123, which serves as a combination storage vessel and handle. Applicator block 121 has a feed channel 124 drilled therein. The end of the block is tapered to facilitate entry into the foliage to be treated; and the outer surface is coated with a sealant such as epoxy, which also strengthens it. A groove is cut into the outer surface, into which is fastened an absorbent pad 125. A curved, resilient flat strip 126 fastened to the connector 122 and opposite the pad 125 is provided to form an application zone 127, into which a leaf can be guided for treatment.

The assembly is designed so that the applicator unit and the liquid supply can be shipped and stored separately; therefore, to place the applicator in service, the sealing cap used in shipment is removed from the bottle 123 containing the liquid and the applicator is screwed on at its connection 122. Liquid is forced into the pad 125, via the channel 124 and the pores in the plastic block 121, by squeezing on the bottle while inverted. The assembly is then carefully positioned so that the leaf selected for treatment (not shown) is within the application zone 127. The strip 126 is depressed so that the leaf is pressed lightly against the pad 125, from which it receives a small amount of liquid. A larger area of the leaf can be treated, if desired, by drawing the applicator along it. The strip 126 is then released and the assembly 120 is withdrawn to complete the treatment. When not in use, the unit can be stored by hanging it from a hook (not shown) inserted in a loop 128.

Turning now to FIGS. 20 & 21, there is shown a liquid applicator unit generally designated 130 that is designed for use as an attachment to an existing source of liquid, such as a hand-held liquid supply 129. The applicator 130 consists of a porous plastic block 131 having a threaded cavity 132 connected to one end of a channel 133, which is plugged at the other end by a screw 134. The cavity 132 can be formed by pressing a hot, threaded die (not shown) into the plastic, allowing it to cool and then removing it by unscrewing it. In this operation, the plastic melts, fills adjacent voids, including the screw threads of the die and the adjacent pores in the plastic, and then hardens, leaving a durable, threaded cavity. In operation, the applicator unit is screwed onto a spray nozzle connection 135 and used to apply liquid directly onto vegetation by wiping it, rather than spraying it through the air. The liquid from the sprayer enters the applicator 130 via the cavity 132, flows into the distribution channel 133, and flows through the pores of the plastic block 131 to the surface of the block. Any surfaces of the block that are not intended to emit liquid are permanently sealed with a sealant, such as glue. In another version, the connection is by way of a sleeve (not shown) attached to the applicator block and slipped over the spray nozzle (not shown), so that the spray is discharged into the sleeve and flows through the applicator.

In view of the above, vehicle-drawn and manually-operated applicator assemblies and related systems and techniques for treating vegetation with liquids have been described, in which porous plastic materials are employed to distribute, regulate and apply the liquid. Standard porous plastic products are available at reasonable costs that have the desired porosity, chemical and abrasion resistance, ease of fabrication and mechanical strength. Polyethylene has proved to be preferable for most applications; however, several other thermoplastic polymers are available, some of which are more suitable than polyethylene for some purposes. For example, a different plastic should be used with solutions containing hydrocarbons, since they are known to cause swelling of polyethylene.

Average pore sizes in the range of 20 to 60 microns have proved to be suitable for the purposes described herein. Average pore sizes between 5 to 20 microns are sufficient to apply a wide range of liquids having various viscosities, flow rates and pressures. Porous plastics are available having porosities in the range of 0.8 to 2000 microns.

The abrasion resistance of the porous plastics tested varies over a wide range. For example, a highly abrasion resistant product (Porex X-5090 grade 750 with a 40 micron average pore size) has been used in the applicators shown in FIG. 2 and in FIGS. 10 and 11. The applicator shown in FIGS. 10 and 11 has been dragged upon several miles of pavement, without appreciable wear or other damage. Abrasion resistance, however, is not an important factor for the applicator illustrated in FIG. 3, since the plastic applicator block in that case does not contact external surfaces. In this case a less abrasion resistant porous plastic can be used (such as Porex X-5095 grade 500 with a 20-30 micron pore size).

What is claimed is:

1. An apparatus for applying liquid to vegetation comprising an applicator block consisting of a porous material defining at least a portion of a contiguous liquid distribution channel, a source of said liquid connected to said applicator block for supplying said liquid to said distribution channel, and a structural member to which said applicator block is mounted for enabling an operator to place said applicator block in contact with said vegetation, so that said liquid may flow from said source to said distribution channel and then uniformly through the pores of said porous material to a surface in wiping contact with said vegetation, and wherein said porous material is sufficiently rigid and dimensionally-stable that it can be cut, sawed, drilled, tapped and threaded using ordinary metal working tools.

2. The combination as claimed in claim 1, wherein said porous material is a plastic polymer.

3. The combination as claimed in claim 1 wherein said porous material has an average pore size in the range of about 5 to 200 microns.

4. The combination as claimed in claim 1, wherein said structural member is a hollow handle enclosing a tube connecting said source of liquid to said applicator block for supplying said liquid to said channel.

5. The combination as claimed in claim 1, wherein said applicator block is elongated and said distribution channel is an internal hole drilled in said applicator block along most of its length.

6. The combination as claimed in claim 5, wherein said hole has an axis that is offset from the center of said applicator block so that said distribution channel is proximate to an elongated application zone on the external surface of said block.

7. The combination as claimed in claim 5, wherein said applicator block is diamond shaped and said structural member is a handle attached to the block at an angle, such that the applicator block is operable in many different positions so as to wipe vegetation with a variety of surfaces ranging from broad, to narrow, to pointed, and from a variety of angles with respect to said vegetation.

8. The combination as claimed in claim 1, wherein at least one surface of said applicator block has fastened to it a structural member that encloses said distribution channel and strengthens said block.

9. The combination as claimed in claim 1, wherein said structural member has a U-shape and encloses three sides of said block.

10. The combination as claimed in claim 1, wherein a soft, absorbent material adjoins a least a portion of said applicator block so as to provide a reservoir for said liquid where it is readily available to be applied to said vegetation.

11. The combination as claimed in claim 1, wherein said applicator block is cantilevered to said structural member so that the block is free to rest upon an underlying surface, and to apply a swath of liquid to said surface as it is moved over said surface.

12. The combination as claimed in claim 1, further comprising at least one wheel mounted to said structural member via a shaft, and at least one arm mounted to said shaft and carrying said block.

13. The combination as claimed in claim 1, wherein said liquid source comprises a collapsible container, thereby enabling the entire liquid-containing system feeding the applicator surface to be sealed while supplying liquid uniformly to said applicator block.

14. The combination as claimed in claim 1, wherein said liquid source comprises a closed squeeze bottle.

15. The combination as claimed in claim 1, further comprising a series of flexible rods inserted in and protruding from a lower surface of said applicator block.

16. The combination as claimed in claim 1, further comprising a series of hollow tubes inserted in a lower surface of said applicator block, and wherein the lower surface of said block is otherwise sealed.

17. The combination as claimed in claim 1, wherein said structural member comprises a horizontal frame for supporting said applicator block above ground level, and means for adjustably mounting said applicator block to said horizontal frame at a selected height above ground level.

18. The applicator assembly as claimed in claim 1, wherein external areas of said applicator block are sealed except at said surface intended to be in wiping contact with said vegetation.

19. A hand-held, self-fed applicator assembly for selectively applying liquid to vegetation, said applicator assembly comprising a replaceable squeeze bottle for containing said liquid, and a block of porous plastic polymer connected to said bottle, said block of porous plastic polymer having an application region defined thereon, and areas of the external surface of said block being sealed except at said application region, and wherein said porous plastic polymer is sufficiently rigid and dimensionally-stable that it can be cut, sawed, drilled, tapped and threaded using ordinary wood and metal working tools.

20. The applicator assembly as claimed in claim 19, wherein said bottle has a threaded outlet portion, and wherein said applicator assembly further comprising means mounted to said block for engaging the threaded outlet portion of said bottle.

21. The applicator assembly as claimed in claim 19, wherein said block is elongated and has an internal hole drilled in it along a substantial portion of its length to provide a distribution channel for the liquid from said squeeze bottle.

22. The applicator assembly as claimed in claim 19, further comprising soft absorbent material attached to said block at said application region.

23. A hand-held, self-fed applicator assembly for selectively applying liquid to vegetation, said applicator assembly comprising a hollow handle including a connector at an upper end portion of the handle for attachment to a bottle of said liquid, and a block of porous plastic polymer attached to a lower end portion of the handle for distributing liquid from said bottle to said vegetation, wherein said porous plastic polymer is sufficiently rigid and dimensionally-stable that it can be cut, sawed, drilled, tapped and threaded using ordinary wood and metal working tools.

24. The combination as claimed in claim 23, wherein said block has downwardly converging sidewalls.

25. The combination as claimed in claim 23, wherein said block has installed in the lower portion thereof absorbent material to receive and retain excess liquid for future use.

26. An applicator comprising a porous plastic applicator block having a connection point for receiving liquid from a source of liquid, and an internal channel defined in said block for connecting pores of said block to said connection point, and wherein said applicator block consists of porous plastic material that is sufficiently rigid and dimensionally-stable that it can be cut, sawed, drilled, tapped and threaded using ordinary wood and metal working tools.

27. The applicator as claimed in claim 26, wherein said applicator block consists of a single piece of material and has integrally formed therein means for connecting said block to a source of liquid.

28. The applicator as claimed in claim 26, wherein said applicator block consists of microporous plastic polymer.

29. The applicator assembly as claimed in claim 26, wherein external areas of said applicator block are sealed except at a surface intended for application of said liquid.

30. A hand-held applicator assembly for selectively applying liquid to vegetation, said applicator assembly including a hand-held liquid supply providing a source of liquid, a block of porous material connected to said hand-held liquid supply, so that liquid from said hand-held liquid supply can be wiped onto said vegetation, and wherein said porous material is sufficiently rigid and dimensionally-stable that it can be cut, sawed, drilled, tapped, and threaded using ordinary wood and metal working tools.

* * * * *